(12) United States Patent
Lubben

(10) Patent No.: US 10,953,744 B2
(45) Date of Patent: Mar. 23, 2021

(54) DUAL DRIVE TRACK SYSTEM

(71) Applicant: DEERE & COMPANY, Moline, IL (US)

(72) Inventor: Jeffrey L. Lubben, Hudson, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/195,901

(22) Filed: Nov. 20, 2018

(65) Prior Publication Data

US 2020/0156466 A1    May 21, 2020

(51) Int. Cl.
| | |
|---|---|
| *B62D 55/125* | (2006.01) |
| *B60K 17/04* | (2006.01) |
| *B62D 55/06* | (2006.01) |
| *F16H 37/06* | (2006.01) |
| *F16H 3/54* | (2006.01) |
| *B62D 55/14* | (2006.01) |

(52) U.S. Cl.
CPC ............ *B60K 17/046* (2013.01); *B62D 55/06* (2013.01); *B62D 55/125* (2013.01); *F16H 3/54* (2013.01); *F16H 37/065* (2013.01); *B62D 55/14* (2013.01)

(58) Field of Classification Search
CPC ....... B60K 17/04; F16H 37/065; B62D 55/06; B62D 55/125; B62D 55/14
USPC ................ 475/210, 213; 180/9.1, 9.21, 373; 74/665 F, 665 T
See application file for complete search history.

(56) References Cited

U.S. PATENT DOCUMENTS

| | | | |
|---|---|---|---|
| 1,985,777 A | 12/1934 | Hamilton | |
| 3,710,886 A | 1/1973 | Wagner | |
| 4,483,407 A * | 11/1984 | Iwamoto .................. | B62B 5/02 180/6.54 |
| 4,865,141 A | 9/1989 | Gey | |
| 5,240,084 A * | 8/1993 | Christianson ...... | B62D 49/0635 180/9.1 |
| 6,953,408 B2 * | 10/2005 | Thompson ............. | B62D 11/14 180/6.44 |
| 7,182,414 B2 * | 2/2007 | Park ................... | B62D 55/0963 305/139 |
| 7,467,831 B2 * | 12/2008 | Bertoni .................. | B62D 55/14 305/125 |
| 9,706,721 B1 * | 7/2017 | Hansen .................. | B62D 55/12 |
| 2008/0023233 A1 * | 1/2008 | Westergaard ........ | B62D 51/007 180/9.1 |
| 2013/0187443 A1 * | 7/2013 | Zakuskin ............... | B62D 55/04 305/120 |

(Continued)

FOREIGN PATENT DOCUMENTS

| | | |
|---|---|---|
| DE | 10224658 A1 | 12/2003 |
| DE | 102011111822 A1 | 2/2013 |
| DE | 102016215720 A1 | 3/2017 |

(Continued)

OTHER PUBLICATIONS

German search report in counterpart application no. 102019216037.9, dated Nov. 27, 2020, 12 pages.

*Primary Examiner* — Roger L Pang
(74) *Attorney, Agent, or Firm* — Taft Stettinius & Hollister LLP; Stephen F. Rost

(57) ABSTRACT

A track assembly that has a drive shaft providing torque to the track assembly, a first drive wheel, a second drive wheel, and a gear assembly rotationally coupling both the first drive wheel and the second drive wheel to the drive shaft.

19 Claims, 5 Drawing Sheets

(56) References Cited

U.S. PATENT DOCUMENTS

2017/0158267 A1\* 6/2017 Boivin .................. B62D 55/12

FOREIGN PATENT DOCUMENTS

EP          0413852 A1    2/1991
WO   WO 2018/018045 A1   1/2018

\* cited by examiner

DUAL DRIVE TRACK SYSTEM

FIELD OF THE DISCLOSURE

The present disclosure relates to a tractor that utilizes a tracked ground engaging mechanism, and more specifically to a track assembly that implements multiple drive wheels to move a track.

BACKGROUND

Many work machines utilize tracked assemblies for propelling the work machine along an underlying surface. Often, a prime mover such as a gas or diesel engine burns fuel to generate torque that is transferred to each tracked assembly at a drive wheel. The drive wheel engages a track to move around rollers of the track assembly to thereby engage the underlying surface and move the work machine there along. The drive wheel typically engages the track either by utilizing cogged drive wheel that engages teeth or cogs of the track or by frictionally engaging an inner surface of the track.

The drive wheel is often sized to sufficiently contact the track assembly to avoid slippage there between. In a cogged drive wheel, slippage may occur when the teeth of the belt skip or otherwise become positioned outside of the corresponding cogged cavity of the drive wheel. Similarly, slippage may occur in a frictional drive wheel when the drive wheel rotates at a speed different from the adjacent belt. In either situation, slippage between the drive wheel and the track results in inefficient power transfer from the prime mover to the track and results in unpredictable machine control among other things.

SUMMARY

One embodiment is a track assembly that has a drive shaft providing torque to the track assembly, a first drive wheel, a second drive wheel, and a gear assembly rotationally coupling both the first drive wheel and the second drive wheel to the drive shaft.

In one example of this embodiment, one of the first and second drive wheels is a cog drive wheel that engages cogs of a track. In one aspect of this example, the other of the first and second drive wheels is a friction drive wheel that transfers torque to the track by frictionally engaging the track.

In another example of this embodiment, both the first and the second drive wheels are cog drive wheels that engage cogs of a track.

In yet another example both the first and the second drive wheels are friction drive wheels that transfer torque to a track by frictionally engaging the track.

In another example, the gear assembly has a drive shaft gear, a first drive gear, and a second drive gear. Wherein, the drive shaft gear, first drive gear, and second drive gear are rotationally coupled to one another. In one aspect of this example, the gear assembly includes a first intermediate gear meshed to both the drive shaft gear and the first drive gear and a second intermediate gear meshed to both the drive shaft gear and the second drive gear.

In another example of this embodiment, the first drive wheel has a first diameter and the second drive wheel has a second diameter, the first diameter being larger than the second diameter. In one aspect of this example, the gear assembly rotates the first drive wheel at a first drive shaft ratio relative to the rotation speed of the drive shaft and the gear assembly rotates the second drive wheel at a second driveshaft ratio relative to the rotation speed of the drive shaft, the first drive shaft ratio being different than the second drive shaft ratio.

Another embodiment is a work machine having at least one track assembly, the work machine having a prime mover rotationally coupled to the at least one track assembly through a transmission, a drive shaft providing torque to the track assembly from the transmission, a first drive wheel, a second drive wheel, and a gear assembly rotationally coupling both the first drive wheel and the second drive wheel to the drive shaft.

In one example of this embodiment, the gear assembly further has a primary planetary gear set having a primary sun gear, a primary planet gear set, and a primary ring gear. In one aspect of this example, the drive shaft is rotationally coupled to the primary planet gear set. In another aspect of this example, the first drive wheel is rotationally coupled to the primary planetary gear set through the primary ring gear and the second drive wheel is rotationally coupled to the primary planetary gear set through the primary sun gear.

In yet another example, a first drive wheel planetary gear set is positioned between the primary planetary gear set and the first drive wheel. One aspect of this example includes a second drive wheel planetary gear set positioned between the primary planetary gear set and the second drive wheel. In another part of this aspect, there is at least one gear reduction assembly between the primary planetary gear set and one of the first or second drive wheel planetary gear sets.

Yet another embodiment of this disclosure is a method for transferring torque to a track of a track assembly that includes providing a prime mover rotationally coupled to the track assembly through a transmission, a drive shaft providing torque to the track assembly from the transmission, a first drive wheel, a second drive wheel, and a gear assembly and rotationally coupling both the first drive wheel and the second drive wheel to the drive shaft with the gear assembly.

One example of this embodiment includes positioning at least one planetary gear set between the drive shaft and the first or second drive wheel.

Another example of this embodiment includes coupling a drive shaft gear to the drive shaft and rotationally coupling the first and second drive wheels to the drive shaft gear. One aspect of this example includes providing at least one intermediate gear between the drive shaft and at least one of the first and second drive wheel.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
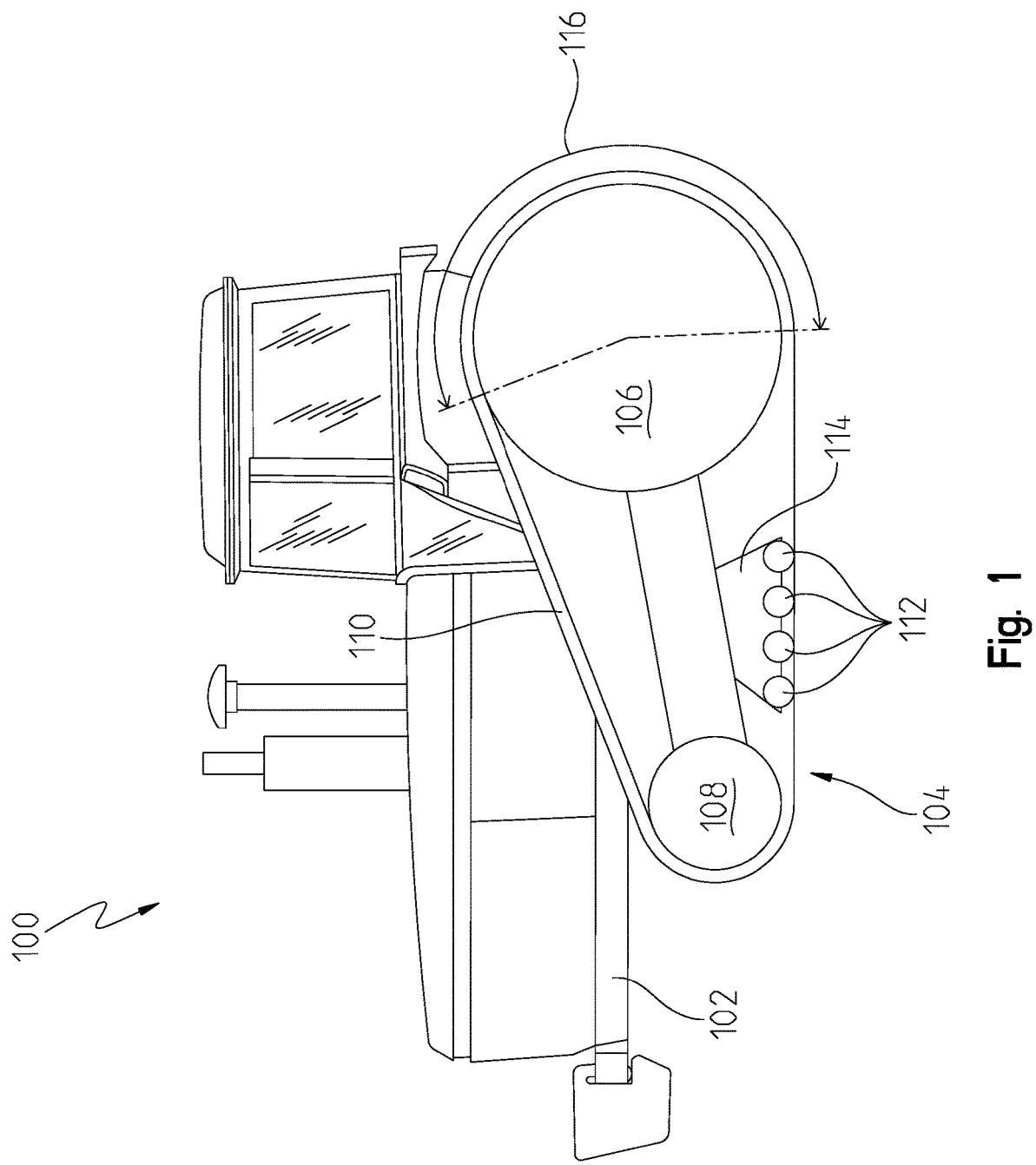
FIG. 1 is one embodiment of a tracked work machine.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

In FIG. 1, one non-exclusive example of a tracked vehicle 100 is illustrated as a full tracked agricultural tractor having a tractor frame 102 holding a prime mover and transmission for driving one or more track undercarriage 104. The undercarriage 104 may be coupled to the frame 102. Further, the undercarriage 104 comprises a main drive wheel 106 driven by the transmission and an idler wheel 108. A positively driven belted track 110 surrounds a portion of the main drive wheel 106 and the idler wheel 108. Track rollers 112 are rotatably mounted to a track roller frame 114 which is pivotally coupled to the undercarriage 104.

In the embodiment of FIG. 1, the main drive wheel 106 frictionally engages an inner surface of the track 110 to move the track 110 about the undercarriage 104. In one aspect of this disclosure, the tracked vehicle 100 of FIG. 1 defines a frictional contact portion 116 between the main drive wheel 106 and the track 110. The frictional contact portion 116 may be the portion of the main drive wheel that contacts the inner surface of the track 110 as it moves thereon. A person skilled in the art understands that the larger the diameter of the main drive wheel 106, the greater the length of the frictional contact portion 116.

The tracked vehicle 100 of FIG. 1 may rely on the frictional engagement between the main drive wheel 106 and the track 110 along the frictional contact portion 116 to move the track 110 about the undercarriage 104 and thereby move the tracked vehicle 100. If the frictional contact portion 116 is too small, the main drive wheel 106 may slip relative to the track 110 when the track 110 is resisting rotation about the undercarriage (for example, when the tracked vehicle 100 is towing a heavy implement). Accordingly, utilizing the single drive wheel 106 that is frictionally engaged to the track 110 often requires a large diameter drive wheel 106 to maximize the frictional contact portion 116 and thereby reduce slipping between the drive wheel 106 and the track 110.

Figure 2:
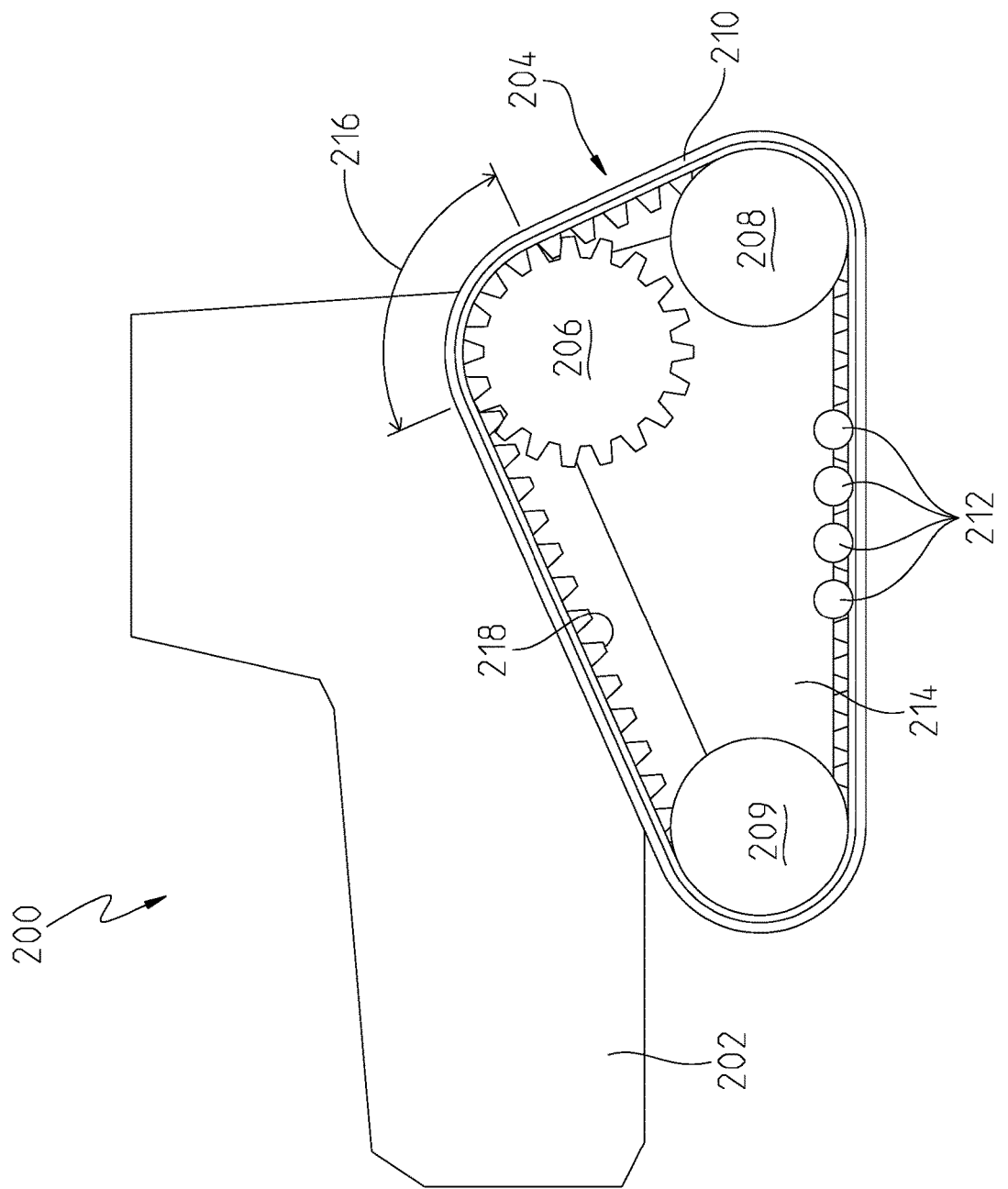
FIG. 2 is another embodiment of a tracked work machine.

Referring now to FIG. 2, another embodiment of a tracked vehicle 200 is illustrated. In FIG. 2, another non-exclusive example of a tracked vehicle 200 is illustrated as a full tracked agricultural tractor having a tractor frame 202 holding a prime mover and transmission for driving one or more track undercarriage 204. The undercarriage 204 may be coupled to the frame 202. Further, the undercarriage 204 comprises a main drive wheel 206 driven by the transmission and a first and second idler wheel 208, 209. A positively driven belted track 210 surrounds a portion of the main drive wheel 206 and the idler wheels 208, 209. Track rollers 212 are rotatably mounted to a track roller frame 214 which is coupled to the undercarriage 204.

In the embodiment of FIG. 2, the main drive wheel 206 is sized to receive cogs 218 defined along an inner surface of the track 210 to move the track 210 about the undercarriage 204. The cogged drive wheel 206 may have cavities or the like defined radially there around to receive the cogs 218 of the track 210 to thereby move the track 210 about the undercarriage 204 without the track 210 slipping relative to the drive wheel 206. The cogged drive wheel 206 utilizes the cogs 218 in the track 210 to reduce slipping. In this embodiment, the cogged drive wheel 206 may have a smaller diameter than the main drive wheel 106 from the embodiment of FIG. 1 because the cogged drive wheel 206 does not require a substantial frictional contact portion 116 to avoid slipping relative to the track 210.

The tracked vehicle 200 of FIG. 2 may rely on the cogs 218 of the track 210 to transfer rotation of the cogged drive wheel 206 to move the track 210 about the undercarriage 204 and thereby move the tracked vehicle 200. The track 210 may be positioned adjacent the outer portion of the main drive wheel 206 along a cogged contact portion 216 of the drive wheel 206. The cogged relationship of the drive wheel 206 and the track 210 may allow for the cogged contact portion 216 to be less than the frictional contact portion 116 of FIG. 1 while allowing the track assembly of FIG. 2 to preform without skipping under similar conditions as FIG. 1. In other words, the track assembly of FIG. 1 requires a larger friction contact portion 116 than the cogged contact portion 216 because the friction drive interface may be more susceptible to slipping than the cogged drive interface.

While the cogged drive wheel 206 may allow a smaller diameter drive wheel to power the track 210 compared to the frictional drive wheel 106, the cogged drive wheel 206 may still slip relative to the track 210 under heavy resistance of the track 210. More specifically, if the track 210 is resisting movement about the undercarriage 204, the cogs of the track 218 may skip or otherwise become positioned outside of the intended corresponding cavity of the cogged drive wheel 206. Accordingly, while the cogged drive wheel 206 may have a smaller diameter than the drive wheel 106 that relies on the frictional contact portion 116 to move the track 110, the cogged drive wheel 206 must still be sufficiently large to minimize instances wherein the cogs 218 skip out of the corresponding cavities of the cogged drive wheel 206. Accordingly, utilizing a cogged drive wheel 206 that engages the cogs 218 of the track 210 requires a sufficiently sized cogged contact portion 216 to minimize the conditions in which the cogs 218 will skip the cavities of the corresponding cogged drive wheel 206.

In both the embodiments of FIGS. 1 and 2, the single drive wheel 106, 206 must be sufficiently sized to avoid the track 110, 210, slipping or skipping relative to the drive wheel 106, 206. When the track 110, 210 slips or skips, the operator may lose predictable control of the tracked vehicle 100, 200. Accordingly, the embodiments of FIGS. 1 and 2 must have a large enough drive wheel 106, 206 to ensure that the occurrence of skipping and slipping is minimized.

Figure 3:
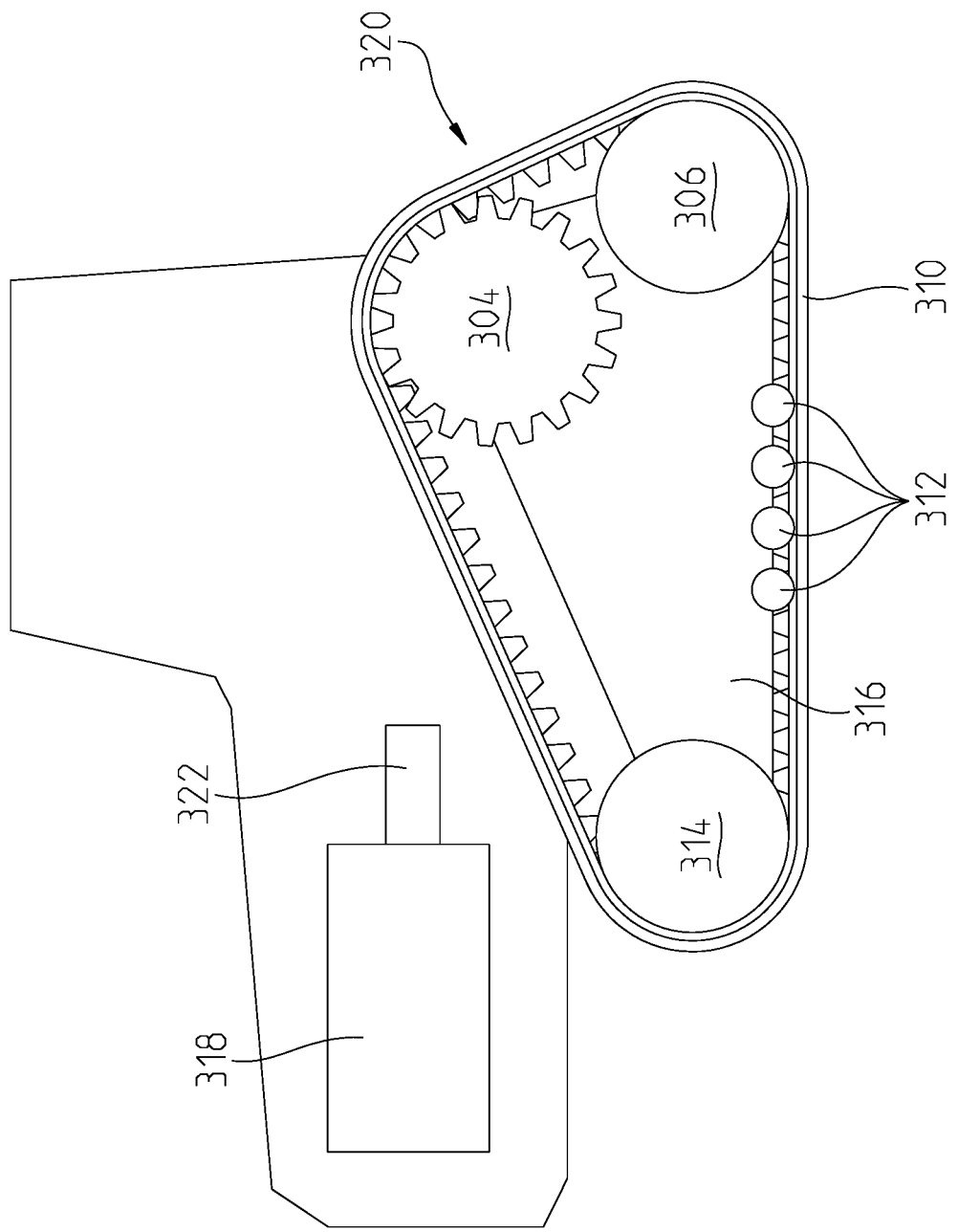
FIG. 3 is another embodiment of a tracked work machine.
Figure 4:
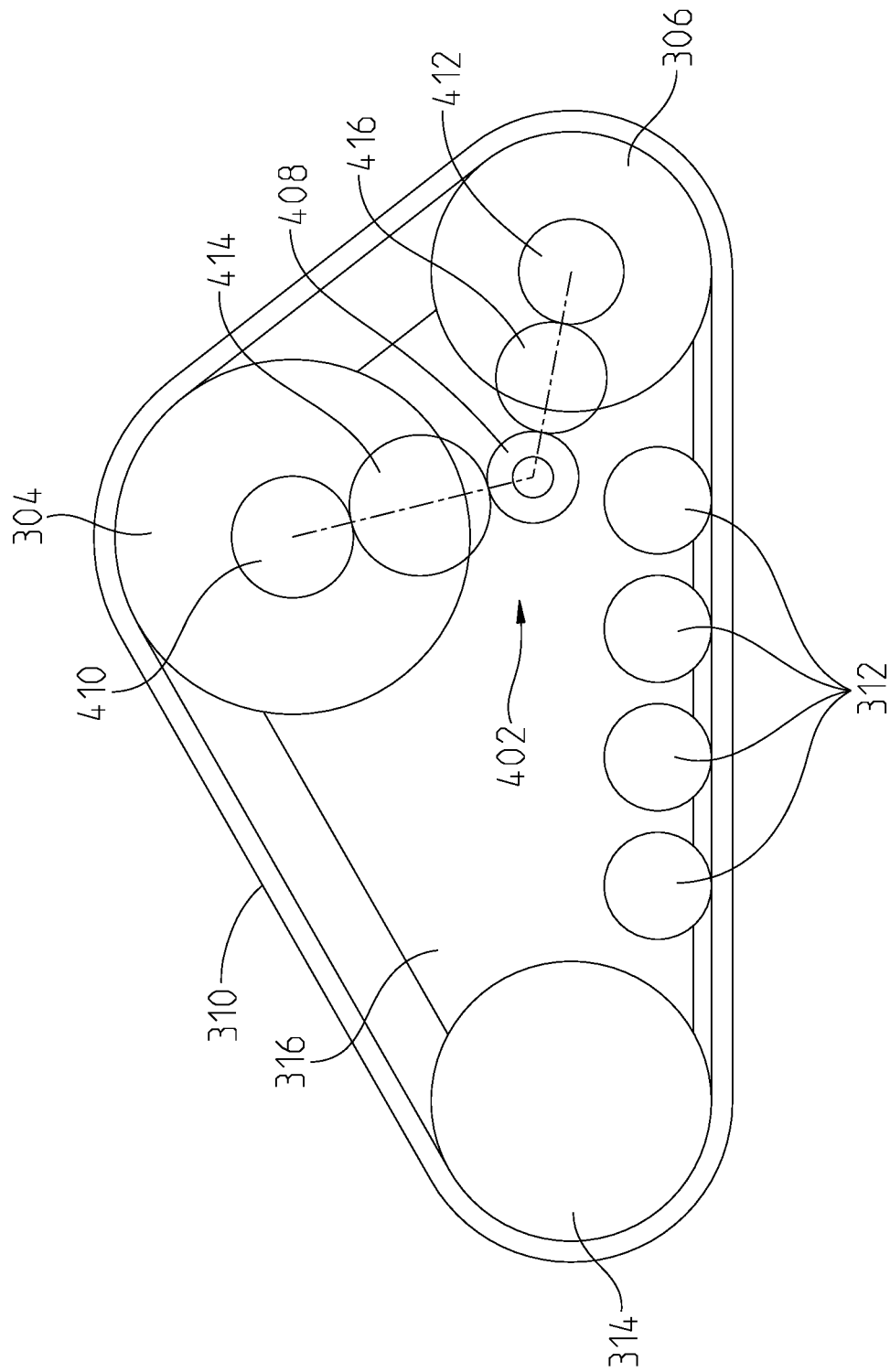
FIG. 4 is a schematic view of a track assembly of the work machine of FIG. 3.

Referring now to FIGS. 3 and 4, one embodiment of a work machine 300 of the present disclosure is illustrated. The work machine 300 may have a prime mover 318 such as a gas, diesel, or electric motor that is selectively coupled to at least one track assembly 320 through a transmission 322 to allow the work machine 300 to move along an underlying surface. In this embodiment, a gear assembly 402 rotationally couples a first drive wheel 304 and a second drive wheel 306 to a drive shaft gear 408 (see FIG. 4). The work machine 300 may have track rollers 312 and an idler wheel 314 rotationally coupled to an undercarriage frame 316 similar to the embodiments of FIGS. 1 and 2. A belt or track 310 may be positioned to at least partially contact the drive wheels 304, 306, the rollers 312, and the idler wheel 314 to move about the undercarriage frame 316 to selectively move a work machine 300 along the underlying surface.

While a single idler wheel 314 and four rollers 312 are illustrated in FIG. 3, this disclosure considers using any number of idler wheels 314 and rollers 312. Accordingly, other embodiments considered herein have more than one idler wheel and less than four rollers 312. Further still, some embodiments may have more than four rollers 312.

The drive shaft gear 408 may be rotationally coupled to the prime mover 318 through the transmission 322. Further, the drive shaft gear 308 may provide torque generated by the prime mover 318 to both the first drive wheel 304 and the second drive wheel 306 through the gear assembly 402. In this configuration the torque distributed to both the first and second drive wheels 304, 306 may be transferred to the belt or track 310 utilizing any known track engagement. Regardless of the track engagement method, powering both the first and second drive wheels 304, 306 may reduce the occurrence of slipping or skipping of the belt 310 compared to similarly sized track assemblies that only power one drive wheel.

In one non-exclusive embodiment, the first drive wheel 304 is a cogged drive wheel that has cavities that correspond with cogs on the track 310 similar to the main drive wheel 206 of FIG. 2. In this embodiment, the second drive wheel 306 may be a friction drive wheel similar to the main drive wheel 106 of FIG. 1. Accordingly, in this embodiment the first drive wheel 304 may apply the torque generated by the prime mover to the track 310 via a cogged interface while the second drive wheel 306 may apply the torque generated by the prime mover to the track 310 via a frictional interface.

In other embodiments, both the first and second drive wheel 304, 306 may have a cogged interface and engage corresponding cogs on the track 310. Alternatively, in other embodiments both the first and second drive wheel 304, 306 may have a frictional interface that engages the track 310 without using cogs. Further still, in yet another embodiment of this disclosure the first drive wheel 304 has a frictional interface while the second drive wheel 306 has a cogged interface with the track 310. Accordingly, this disclosure considers utilizing any known drive wheel/track interface in any combination with the first and second drive wheels 304, 306.

The gear assembly 402 may rotationally couple the drive shaft gear 408 with a first drive gear 410 coupled to the first drive wheel 304 and to a second drive gear 412 coupled to the second drive wheel 306. In this configuration, when torque is provided to the drive shaft gear 408 from the prime mover 318, the torque is transferred to both the first and second drive gear 410, 412 through the gear assembly 402.

In one example of the embodiment of FIG. 4, the gear assembly 402 may have a first intermediate gear 414 positioned between the drive shaft gear 408 and the first drive gear 410. Similarly, a second intermediate gear 416 may be positioned between the drive shaft gear 408 and the second drive gear 412. In this configuration, the drive shaft gear 408 transfers torque to the first and second drive wheel 304, 306 through the respective first and second intermediate gear 414, 416.

In one aspect of this disclosure, the gear assembly 402 is configured to ensure that both the first and second drive wheels 304, 306 rotate at a proper rate relative to one another to ensure that the belt 310 is transitioned about the track assembly 320 at the same speed. In other words, if the outer diameters of the first and second drive wheels 304, 306 are not the same, the gear assembly 402 may have a gear ratio that ensures the portion of the drive wheels 304, 306 contacting the track 310 has substantially the same velocity at the point of contact with the track 310. In one non-exclusive example, the second drive wheel 306 may have an outer diameter that is less than the outer diameter of the first drive wheel 304. In this configuration, the gear assembly 402 would be configured to rotate the second drive wheel 306 at a faster angular velocity than the first drive wheel 304 to address the different outer diameters of the drive wheels 304, 306.

A person skilled in the art understands that the specific gear ratios of the gear assembly 402 can be modified to address drive wheels 304, 306 with different outer diameters. More specifically, the specific gear ratios of the gear assembly 402 may be such that the track 310 will be equally moved there around by both drive wheels 304, 306. Accordingly, one embodiment may have a first drive wheel with a diameter that is less than the second drive wheel 306. In yet another embodiment, the diameter of the first and second drive wheel may be substantially the same. In yet another embodiment, the second drive wheel 306 may have a diameter that is less than the first drive wheel 304. Accordingly, this disclosure considers implementing a gear assembly 402 to accommodate any combination of drive wheel diameters 304, 306.

Further, the gear ratio of the gear assembly 402 may be modified by altering any one or more of the first and second drive gear 410, 412. Accordingly, the size of any of the gears 408, 410, 412, 414, 416 of the gear assembly 402 may be altered to ensure the track assembly 320 performs properly and the track 310 is moved there along at the same rate by both drive wheels 304, 306.

Figure 5:
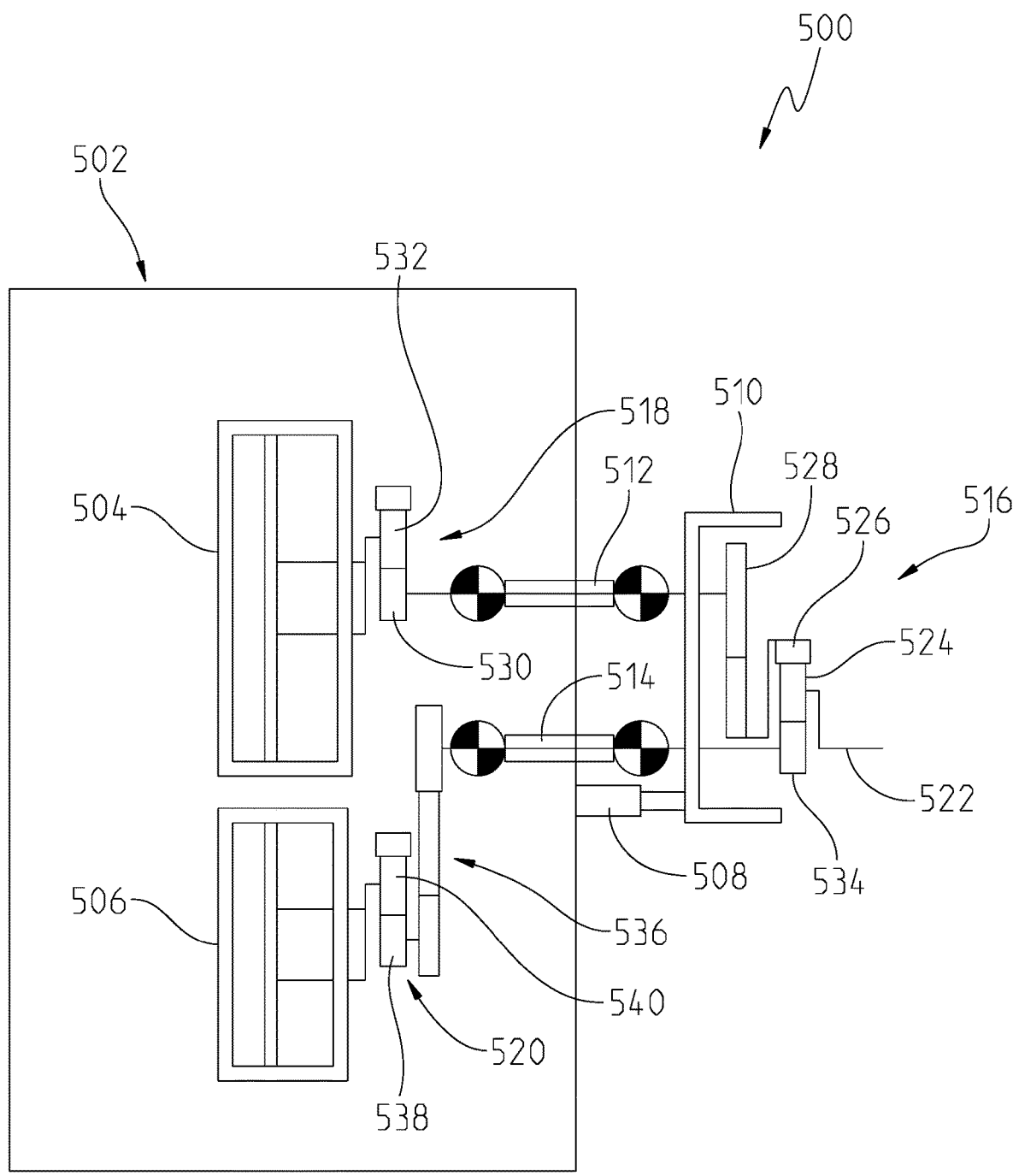
FIG. 5 is a schematic view of a track assembly with a suspension.

Referring now to FIG. 5, another embodiment of the present disclosure is illustrated. FIG. 5 illustrates a schematic view of a gear assembly 500 of another drive configuration for a track assembly 502. The drive configuration may have a first and second drive wheel 504, 506 similar to the embodiment of FIGS. 3 and 4. In the embodiment of FIG. 5, a suspension assembly 508 may couple the track assembly 502 to a frame portion 510 of the tracked vehicle. Both the first and second drive wheels 504, 506 may be simultaneously driven through corresponding first and second prop shafts 512, 514. The prop shafts 512, 514 allow the track assembly 502 to move relative to the frame portion 510 while transferring torque generated by the prime mover to the drive wheels 504, 506. In one non-exclusive example, each end of the prop shafts 512, 514 may have a cardan joint or the like to allow for at least some movement between the track assembly 502 and the frame portion 510.

In the embodiment of FIG. 5, the gear assembly may include primary planetary gear set 516, a first drive wheel planetary gear set 518, and a second drive wheel planetary gear set 520. Each of the gear sets 516, 518, 520 may ultimately be rotationally coupled to a drive shaft 522 of the transmission to distribute torque to the corresponding drive wheels 504, 506. The drive wheels 504, 506 may then engage a track via a cogged, frictional, or the like engagement to thereby move the track about the track assembly as described above for FIG. 4.

The primary planetary gear set 516 may have a primary planet gear set 524 that is coupled to the drive shaft 522. The primary planetary gear set 516 may also have a primary ring gear 526 that is rotationally coupled to the first prop shaft 512. In one non-exclusive example, the first prop shaft 512 may have a first prop shaft gear 528 that is rotationally coupled to primary ring gear 526 to transfer torsional loads input through the drive shaft 522 to the prop shaft 512.

As discussed above, the first prop shaft 512 may extend between the track assembly 502 and the frame portion 510 to allow the track assembly 502 to move relative to the frame portion 510 via the suspension assembly 508 while transferring torque to the first drive wheel 504. The first prop shaft 512 may further be coupled to the first drive wheel planetary gear set 518. More specifically, the first prop shaft 512 may be rotationally coupled to a first drive wheel sun gear 530. Further, the first drive wheel 504 may ultimately be coupled to the first drive wheel planetary gear set 518 through a first drive wheel planet gear set 532. Accordingly, the first drive wheel 504 may have torque transferred thereto from the prime mover through the primary planetary gear set 516, the first prop shaft 512, and the first drive wheel planetary gear set 518.

The second prop shaft 514 may be coupled to a primary sun gear 534 of the primary planetary gear set 516. In this configuration, as the drive shaft 522 provides torque to the primary planet gear set 524 of the primary planetary gear set 516, the torque is distributed to the first prop shaft 512 via the primary ring gear 526 and to the second prop shaft 514 via the primary sun gear 534. A gear reduction assembly 536 may be coupled to the second prop shaft 514 on the track assembly 502 end. The gear reduction assembly 536 may be one or more gears coupled to one another to provide an input to the second drive wheel planetary gear set 520 that corresponds with any diameter differences between the first drive wheel 504 and the second drive wheel 506. In other words, the gear reduction assembly 536 may provide a gear reduction so the second drive wheel planetary gear set 520 receives an input that promotes both the first and second drive wheels 504, 506 providing the same velocity where the drive wheels 504, 506 contact the track.

The gear reduction assembly may provide an output to a second drive wheel sun gear 538 of the second drive wheel planetary gear set 520. The second drive wheel sun gear 538 may engage a second drive wheel planet gear set 540. Further, the second drive wheel planet gear set 540 may be coupled to the second drive wheel 506 to rotate the second drive wheel 506 therewith.

In the embodiment of FIG. 5, the track assembly 502 is coupled to the frame portion 510 through the suspension assembly 508 to allow the track assembly 502 to move relative to the frame portion 510. Further, the first and second prop shafts 512, 514 are positioned to allow the track assembly 502 to move relative to the frame portion 510 while rotationally coupling the primary planetary gear set 516 to both the first and second drive wheel planetary gear sets 518, 520. Accordingly, in one aspect of the embodiment of FIG. 5 both drive wheels 504, 506 are provided torque from the prime mover and the track assembly 502 can move relative to the frame portion 510.

While particular examples of planetary gear sets and gear configurations are described herein, those are meant of one example only and others are considered as well. One aspect of this disclosure is powering both the first and second drive wheels 504, 506 while allowing the track assembly 502 to move independent of the frame portion 510. Accordingly, other gear configurations and the like are also considered herein.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. A track assembly, comprising:
a drive shaft providing torque to the track assembly generated by a prime mover on a frame of a work machine;
a first drive wheel that at least partially contacts a track of the track assembly, the first drive wheel having a first diameter;
a second drive wheel that at least partially contacts the track of the track assembly, the second drive wheel having a second diameter;
an idler wheel that at least partially contacts the track of the track assembly; and
a gear assembly rotationally coupling both the first drive wheel and the second drive wheel to the drive shaft;
wherein, the track wraps at least partially around each of the first drive wheel, the second drive wheel, and the idler wheel;
wherein, the idler wheel is not directly driven by the gear assembly;
wherein, the first diameter of the first drive wheel is greater than the second diameter of the second drive wheel.

2. The track assembly of claim 1, further wherein one of the first and second drive wheels is a cog drive wheel that engages cogs of a track.

3. The track assembly of claim 2, further wherein the other of the first and second drive wheels is a friction drive wheel that transfers torque to the track by frictionally engaging the track.

4. The track assembly of claim 1, further wherein both the first and the second drive wheels are cog drive wheels that engage cogs of a track.

5. The track assembly of claim 1, further wherein both the first and the second drive wheels are friction drive wheels that transfer torque to a track by frictionally engaging the track.

6. The track assembly of claim 1, further wherein the gear assembly comprises:
a drive shaft gear;
a first drive gear; and
a second drive gear;
wherein, the drive shaft gear, first drive gear, and second drive gear are rotationally coupled to one another.

7. The track assembly of claim 6, further wherein the gear assembly further comprises:
a first intermediate gear meshed to both the drive shaft gear and the first drive gear; and
a second intermediate gear meshed to both the drive shaft gear and the second drive gear.

8. The track assembly of claim 1, further wherein the gear assembly rotates the first drive wheel at a first drive shaft ratio relative to the rotation speed of the drive shaft and the gear assembly rotates the second drive wheel at a second driveshaft ratio relative to the rotation speed of the drive shaft, the first drive shaft ratio being different than the second drive shaft ratio.

9. A work machine having at least one track assembly, the work machine comprising:
a prime mover rotationally coupled to the at least one track assembly through a transmission;
a drive shaft providing torque to the track assembly from the transmission;
a first drive wheel having a first diameter;
a second drive wheel having a second diameter;
an idler wheel; and a gear assembly rotationally coupling both the first drive wheel and the second drive wheel to the drive shaft;

wherein, a track of the track assembly wraps at least partially around each of the first drive wheel, the second drive wheel, and the idler wheel wherein, the gear assembly does not directly drive the idler wheel;

wherein, the first diameter is greater than the second diameter.

10. The work machine of claim 9, further wherein the gear assembly further comprises a primary planetary gear set having a primary sun gear, a primary planet gear set, and a primary ring gear.

11. The work machine of claim 10, further wherein the drive shaft is rotationally coupled to the primary planet gear set.

12. The work machine of claim 11, further wherein the first drive wheel is rotationally coupled to the primary planetary gear set through the primary ring gear and the second drive wheel is rotationally coupled to the primary planetary gear set through the primary sun gear.

13. The work machine of claim 10, further comprising a first drive wheel planetary gear set positioned between the primary planetary gear set and the first drive wheel.

14. The work machine of claim 13, further comprising a second drive wheel planetary gear set positioned between the primary planetary gear set and the second drive wheel.

15. The work machine of claim 14, further comprising at least one gear reduction assembly between the primary planetary gear set and one of the first or second drive wheel planetary gear sets.

16. A method for transferring torque to a track of a track assembly, comprising:

providing a prime mover rotationally coupled to the track assembly through a transmission, a drive shaft providing torque to the track assembly from the transmission, a first drive wheel having a first diameter, a second drive wheel having a second diameter that is larger than the first diameter, an idler wheel, and a gear assembly;

rotationally coupling both the first drive wheel and the second drive wheel to the drive shaft with the gear assembly;

rotationally coupling the idler wheel to the track assembly so the idler wheel is not directly driven by the gear assembly; and wrapping a track of the track assembly at least partially around each of the first drive wheel, second drive wheel, and idler wheel.

17. The method of transferring torque to a track of claim 16, further comprising coupling a drive shaft gear to the drive shaft and rotationally coupling the first and second drive wheels to the drive shaft gear.

18. The method of transferring torque to a track of claim 17, further comprising providing at least one intermediate gear between the drive shaft and at least one of the first and second drive wheel.

19. The method for transferring torque to a track of claim 16, further comprising positioning at least one planetary gear set between the drive shaft and the first or second drive wheel.

* * * * *